US012069598B2

(12) United States Patent
Kalhan et al.

(10) Patent No.: US 12,069,598 B2
(45) Date of Patent: Aug. 20, 2024

(54) PAGE MESSAGE NOTIFICATION

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 427 days.

(21) Appl. No.: 17/628,770

(22) PCT Filed: Jul. 22, 2020

(86) PCT No.: PCT/US2020/043035
§ 371 (c)(1),
(2) Date: Jan. 20, 2022

(87) PCT Pub. No.: WO2021/016332
PCT Pub. Date: Jan. 28, 2021

(65) Prior Publication Data
US 2022/0272658 A1   Aug. 25, 2022

Related U.S. Application Data

(60) Provisional application No. 62/877,413, filed on Jul. 23, 2019, provisional application No. 62/886,123, filed on Aug. 13, 2019.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04L 5/0053* (2013.01);
(Continued)

(58) Field of Classification Search
CPC ... H04W 56/001; H04W 76/27; H04W 48/12; H04W 52/0216; H04W 52/0229;
(Continued)

(56) References Cited

U.S. PATENT DOCUMENTS

| 2024/0056965 A1* | 2/2024 | Choi ................. H04W 52/0216 |
| 2024/0129854 A1* | 4/2024 | Elshafie ............ H04W 52/0235 |
| 2024/0129912 A1* | 4/2024 | Abotabl ............ H04W 72/0453 |

FOREIGN PATENT DOCUMENTS

| CN | 117044287 A | * | 11/2023 | .......... H04W 68/025 |
| CN | 117204045 A | * | 12/2023 | ......... H04L 27/2601 |

(Continued)

*Primary Examiner* — Adam D Houston

(57) ABSTRACT

An apparatus includes an interface and a processor. The interface sends and receives data over a network. The processor uses the interface to transmit a first media file to a device of a user. The first media file presents a first choice between at least two options. The processor uses the interface to receive from the user a first selection in response to the first choice. In response to receiving the first selection, the processor transmits a second media file to the device. The second media file presents a second choice between at least two options. The processor uses the interface to receive from the user a second selection in response to the second choice. The processor identifies, based in part on the first selection and the second selection, a second user as potentially compatible with the user and transmits to the user a profile of the second user.

25 Claims, 5 Drawing Sheets

(51) Int. Cl.
  *H04W 48/12*    (2009.01)
  *H04W 52/02*    (2009.01)
  *H04W 68/00*    (2009.01)
  *H04W 68/02*    (2009.01)
  *H04W 76/27*    (2018.01)

(52) U.S. Cl.
  CPC ....... *H04W 48/12* (2013.01); *H04W 52/0216* (2013.01); *H04W 52/0229* (2013.01); *H04W 52/0232* (2013.01); *H04W 52/0274* (2013.01); *H04W 56/0015* (2013.01); *H04W 68/005* (2013.01); *H04W 68/02* (2013.01); *H04W 76/27* (2018.02)

(58) Field of Classification Search
  CPC ......... H04W 52/0232; H04W 52/0274; H04W 56/0015; H04W 68/005; H04W 68/02; H04L 5/0051; H04L 5/0053
  See application file for complete search history.

(56) References Cited

FOREIGN PATENT DOCUMENTS

| | | | | | |
|---|---|---|---|---|---|
| CN | 117480749 | A | * | 1/2024 | ............. H04L 5/001 |
| CN | 117529954 | A | * | 2/2024 | ........ H04W 52/0216 |
| CN | 117561691 | A | * | 2/2024 | ....... H04L 27/26025 |
| EP | 3920601 | A1 | * | 12/2021 | ........ H04W 52/0219 |
| KR | 20240039542 | A | * | 3/2024 | |

\* cited by examiner

PAGE MESSAGE NOTIFICATION

CLAIM OF PRIORITY

The present application claims priority to Provisional Application No. 62/877,413, entitled "Increasing MTC Devices Power-Consumption Efficiency by Using Paging with A UE-specific Synchronization Signal and Information", filed Jul. 23, 2019 and to Provisional Application No. 62/886,123, entitled "Increasing Wireless Devices Power-Consumption Efficiency with Scheduled UE-specific Synchronization Signal", filed Aug. 13, 2019 which are both assigned to the assignee hereof and hereby expressly incorporated by reference in their entirety.

FIELD

This invention generally relates to wireless communications and more particularly to transmission of page messages to user equipment devices.

BACKGROUND

In a wireless network, the mobile device or user equipment (UE) is required to maintain an accurate symbol timing synchronization with the serving base station. The network synchronization is needed to correctly decode the received downlink signals transmitted from the base station. The mobile device "listens" or monitors the synchronization signal transmitted by the serving base station to adjust the internal clock of the mobile device which allows tracking of the symbol and frame time boundaries. In order to save power, the mobile device periodically turns off its transceiver to go to a sleep state. The mobile device periodically wakes-up from the sleep state to check whether a page message was received from the base station. If a page is received, the mobile device stays on to receive the subsequent control and data signals. Battery consumption at the mobile device is reduced by increasing the time the mobile device is in the sleep state. There is a drawback of a long duration sleep state, however, in that the mobile device clock may drift away from the nominal timing value. As a result, every time the mobile device wakes up from sleep, the mobile device typically needs to reacquire the symbol timing before checking the page message. Although the time required for resynchronization can be reduced by reducing the sleep duration, the time required for resynchronization is often more than the time required to receive and decode the page message.

SUMMARY

A page message preamble sequence is transmitted by a base station within a data channel transmission. After a sleep state, a mobile device attempts to acquire the page message preamble sequence without decoding a downlink control channel to obtain signal transmission information related to transmission of the page message from a base station. The page message preamble sequence indicates the existence of a page message for the mobile device within the data channel. The mobile device returns to the sleep state in response to not detecting a page message preamble sequence that indicates a page message. Prior to entering a sleep state, the mobile device receives transmission format information indicative of a transmission format of the page message preamble sequence. Page message timing information indicative of a transmission time of the page message can also be received prior to entering the sleep state. Additional transmission resource information of the page message is also obtained from the page message preamble sequence in some circumstances.

DETAILED DESCRIPTION

Figure 1:
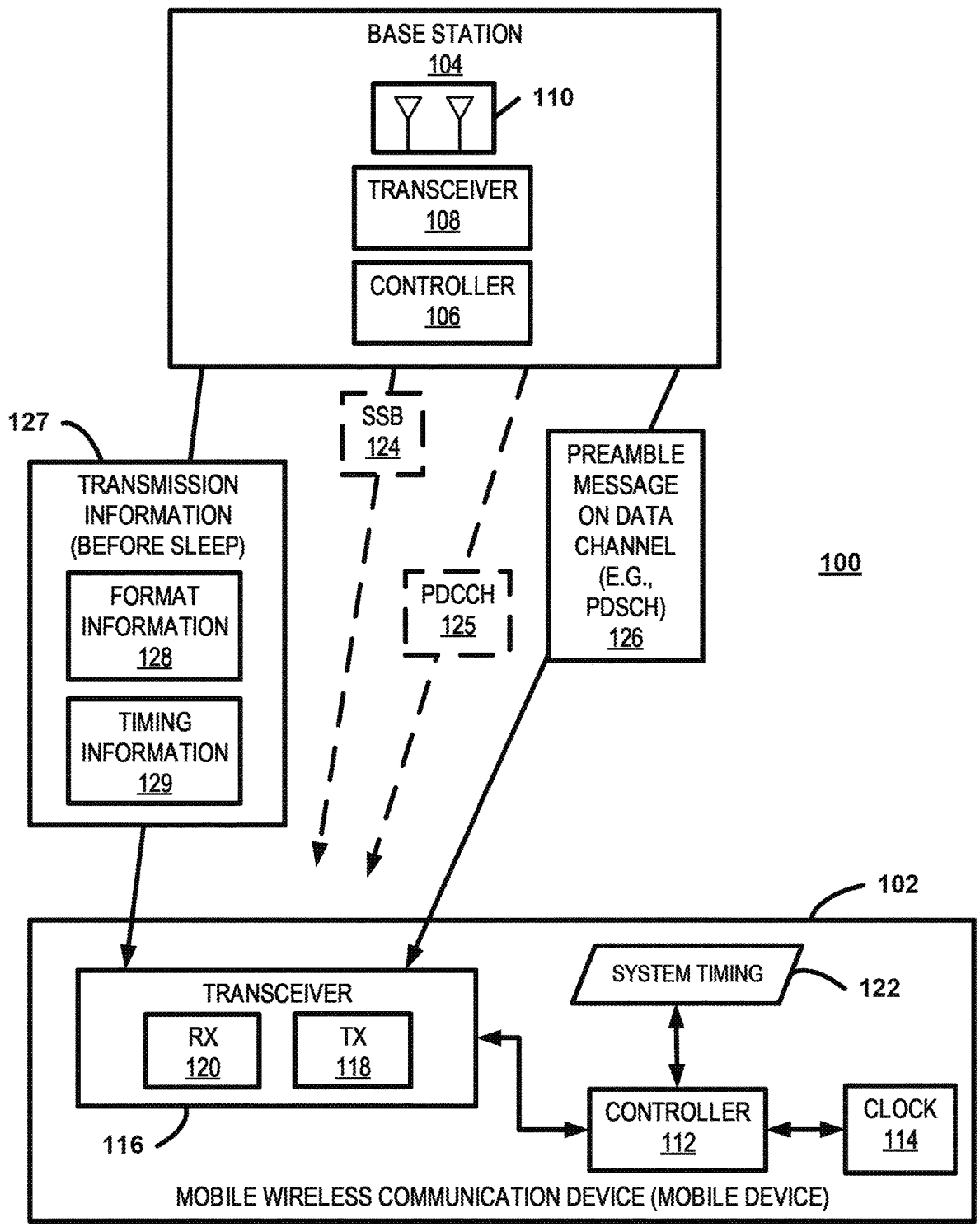
FIG. 1 is a block diagram of a communication system for an example where a mobile wireless user equipment (UE) device (mobile device) determines whether a page exists for the mobile device by attempting to acquire a page message preamble sequence after exiting a sleep state and without receiving a System Signal Block (SSB).

As discussed above, mobile devices need to wake up from the sleep state to check for page messages. In some conventional systems, the mobile device periodically exists the sleep cycle, acquires a synchronization signal and decodes a physical downlink control channel (PDCCH) to determine if a page message indication is present. The mobile device, however, must wake up before the arrival of the page message indication in order to allow adequate time for circuitry to warmup. In such systems and in situations where the sleep time is relatively long, the time for decoding the PDCCH is typically much less than the time required to warmup and synchronize. If no page message indication is found, the mobile device returns to the sleep state and the process is repeated in the next wakeup cycle. Since it is unlikely that a page message is sent, the mobile device inefficiently consumes power in checking for page messages by warming up and synchronizing in situations where no page message has been sent. In order to reduce the time needed to decode the PDCCH, some systems have deployed a wake-up signal (WUS) that eliminates the need to decode the entire PDCCH to determine is paging indicator is present. The WUS is relatively short and transmitted at a time before the device is scheduled to wake up and decode the PDCCH during the predetermined time duration. The WUS indicates whether page message indicator is available for the mobile device. As a result, the time spent determining whether a page message indicator is present is reduced when no page message indicator has been sent. This resynchronization time becomes a much larger overhead for the Machine-type-Communications (MTC) UE devices. Achieving a long battery-life, on the order of 10 years, 15 years or more, is an important aspect for the MTC networks. As a result, MTC devices typically have a much longer sleep-cycle which may be on the order of several minutes or several hours. Specifically, with extended-DRX (eDRX), the DRX cycle is extended up to and beyond 10.24 s in idle mode, with a maximum value of 2621.44 seconds (43.69 minutes). For NB-IoT, the maximum value of the DRX cycle is 10485.76 seconds (2.91 hours). Such a long sleep duration results in much larger clock-drifts for the mobile device (UEs). In addition, the MTC devices operate in deep coverage areas where the downlink received signal strength is very low. In extreme scenarios the received signal strength could be as low as SNR=−14 dB. Having a large clock-drift and receiving a signal at very low signal strength forces the MTC devices to take several hundreds of milliseconds to acquire the network timing. The relatively long time needed to detect the correct timing is due to the need for the devices to receive and accumulate multiple repetitions of the synchronization signal over time. In order to achieve a higher SNR, the mobile devices coherently combine the multiple copies of the synchronization signal. The difference in the time required to acquire synchronization compared to the time required to decode the PDCCH, therefore is even larger for MTC devices. For example, in the existing MTC LTE, a mobile device would require almost 400 ms=80 PSS/SSS subframes with PSS/SSS transmitted every 5 ms whereas only a few microseconds are required to decode the PDCCH. Even with the use of a WUS, the time required determine if a page message has been sent is still relatively long.

In the examples discussed herein, however, the time needed to determine that no page message has been sent is significantly reduced by a process where, after exiting the sleep state, the mobile device attempts to detect a preamble message without synchronization and without decoding the control channel. The synchronization signals used in conventional systems include additional information that does not need to be obtained by the mobile device in the examples herein. For example, conventional systems obtain synchronization by detecting and receiving the Synchronization Signal Block (SSB) which contains the Primary Synchronization Signal (PSS) and Secondary Synchronization Signal (SSS) as well as other information. In the techniques discussed herein, however, the mobile device can determine when no page message indicator has been sent without time consuming synchronization or decoding of the downlink control channel. Additional processing is only performed when the preamble message indicates a page message has been sent. Therefore, energy for receiving synchronization signals in the SSB is reduced by eliminating the need to synchronize when adequate system timing is maintained at the mobile device during the sleep state. In addition, mobile device operation is more efficient when exiting the sleep state since the mobile device skips the step of decoding the control channel such as the PDCCH before receiving and directly decoding the channel including the page message such as the PDSCH. Reducing the time and energy for resynchronization reduces power consumption and extends battery life. For the examples herein, the mobile device retains page message transmission information including at least transmission format information indicative of a transmission format of a page message for the mobile device and page message timing information indicative of a transmission time of the page message. Some or all of the transmission information may be received in a transmission from the base station before the mobile device enters the sleep state. The transmission information can be transmitted at any point before the mobile device enters the sleep state and may be transmitted over more than one transmission. For at least some of the examples herein, the transmission information is transmitted to the mobile device using dedicated signaling (e.g., RRC Connection Release message) or via system information before the mobile device enters the sleep state. In some circumstances, however, the mobile device may be configured with at least some of the transmission information when registering with the network. For example, the mobile device can be firmware-programmed to be preconfigured with the transmission information in some situations.

FIG. 1 is a block diagram of a communication system 100 for an example where a mobile wireless user equipment (UE) device (mobile device) 102 determines whether a page exists for the mobile device by attempting to acquire a page message preamble sequence after exiting a sleep state and without receiving a downlink control channel transmission or receiving a System Signal Block (SSB). In some situations, the mobile device may receive a reduced number of SSB transmissions before attempting to receive the page message preamble sequence as compared to the number of SSB receptions required in conventional systems when exiting sleep to monitor for page messages. The communication system 100 includes numerous base stations, such as the base station 104, that provide various wireless services to mobile devices that are located within the respective service areas of the base stations. In the interest of clarity and brevity, the communication system 100 of FIG. 1 is shown as having only one base station 104 and only one mobile device 102. The communication system 100 may include any number of base stations and mobile devices. For the example, the communication system 100 operates in accordance with one or more revisions of the 3rd Generation Partnership Project Long Term Evolution (3GPP LTE) communication specification and/or revisions of the 5G New Radio communication specification.

The base station 104 may be referred to as a transceiver station, access point, eNodeB or eNB where the applied terms sometimes depend on the communication technology that the system supports. In the case of implementations that utilize the 5G New Radio air interface, the base station is sometimes referred to as a gNB. The base station 104 communicates with wireless user equipment mobile devices, such as the mobile device 102, by transmitting downlink signals to the mobile devices and receiving uplink signals from the mobile devices. The base station 104 includes a controller 106, transceiver 108, and an antenna 110, as well as other electronics, hardware, and code. The base station 104 is any fixed, mobile, or portable equipment that performs the functions described herein. The various functions and operations of the blocks described with reference to the base station 104 may be implemented in any number of devices, circuits, or elements. Two or more of the functional blocks may be integrated in a single device, and the functions described as performed in any single device may be implemented over several devices. The base station 104 may be a fixed device or apparatus that is installed at a particular location at the time of system deployment. Examples of such equipment include fixed base stations or fixed transceiver stations. In some situations, the base station 104 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 104 may be a portable device that is not fixed to any particular location. Accordingly, the base station 104 may be a portable user device such as a mobile device in some circumstances.

The controller 106 includes any combination of hardware, software, and/or firmware for executing the functions described herein as well as facilitating the overall functionality of the base station 104. An example of a suitable controller 106 includes code running on a microprocessor or processor arrangement connected to memory. The transceiver 108 includes a transmitter and a receiver. The transmitter includes electronics configured to transmit wireless signals. In some situations, the transmitter may include multiple transmitters. The receiver includes electronics configured to receive wireless signals. In some situations, the receiver may include multiple receivers. The receiver and transmitter receive and transmit signals, respectively, through the antenna 110. The antenna 110 may include separate transmit and receive antennas. In some circumstances, the antenna 110 may include multiple transmit and receive antennas.

The transceiver 108 in the example of FIG. 1 performs radio frequency (RF) processing including modulation and demodulation. The receiver, therefore, may include components such as low noise amplifiers (LNAs) and filters. The transmitter may include filters and amplifiers. Other components may include isolators, matching circuits, and other RF components. These components in combination or cooperation with other components perform the base station functions. The required components may depend on the particular functionality required by the base station.

The transmitter includes a modulator (not shown), and the receiver includes a demodulator (not shown). The modulator modulates the signals to be transmitted as part of the downlink signals and can apply any one of a plurality of modulation orders. The demodulator demodulates any uplink signals received at the base station 104 in accordance with one of a plurality of modulation orders.

In some examples, the mobile device 102 is any mobile wireless communication device such as a mobile phone, a transceiver modem, a personal digital assistant (PDA), a tablet, or a smartphone. In other examples, the mobile device 102 is a machine type communication (MTC) communication device. The mobile device 102, therefore, is any fixed, mobile, or portable equipment that performs the functions described herein. The various functions and operations of the blocks described with reference to mobile device 102 may be implemented in any number of devices, circuits, or elements. Two or more of the functional blocks may be integrated in a single device, and the functions described as performed in any single device may be implemented over several devices.

The mobile device 102 includes at least a controller 112, a clock 114, and a transceiver 116 which includes a transmitter 118 and a receiver 120. The controller 112 includes any combination of hardware, software, and/or firmware for executing the functions described herein as well as facilitating the overall functionality of a mobile device. An example of a suitable controller 112 includes code running on a microprocessor or processor arrangement connected to memory. The clock 114 is any device or circuitry that provides a stable clock signal that can used by the controller to maintain timing and synchronization for general operation. The clock 114 may include a crystal oscillator in some circumstances. The controller 112, in conjunction with the clock 114, maintains a system timing 122 of the system.

The transmitter 118 includes electronics configured to transmit wireless signals. In some situations, the transmitter 118 may include multiple transmitters. The receiver 120 includes electronics configured to receive wireless signals. In some situations, the receiver 120 may include multiple receivers. The receiver 120 and transmitter 118 receive and transmit signals, respectively, through an antenna (not shown) which may include separate transmit and receive antennas. In some circumstances, the antenna may include multiple transmit and receive antennas.

The transmitter 118 and receiver 120 in the example of FIG. 1 perform radio frequency (RF) processing including modulation and demodulation. The receiver 120, therefore, may include components such as low noise amplifiers (LNAs) and filters. The transmitter 118 may include filters and amplifiers. Other components may include isolators, matching circuits, and other RF components. These components in combination or cooperation with other components perform the mobile device functions. The required components may depend on the particular functionality required by the mobile device 102.

As discussed above, the mobile device includes a clock that maintains operational timing for the mobile device. In conjunction with the clock, the controller maintains a system timing 122 of the system. The mobile device periodically receives synchronization signals such as the Primary Synchronization Signal (PSS) and the Secondary Synchronization Signal (SSS) in the SSB 124. Due to imperfections of the clock 114, the clock timing may drift over time and the system timing 122 maintained at the mobile device will lose synchronization with the system. The synchronization signals allow the system timing 122 at the mobile device to be synchronized to the system timing of the communication system. In conventional systems, as discussed above, the mobile device resynchronizes after existing the sleep state. After waking up the mobile device ramps up the radio frequency circuits before acquiring timing by detecting the PSS/SSS. The mobile device then waits to receive the WUS and attempts to detect it. If the WUS is detected successfully, the mobile device determines that the page is sent and stays awake to wait for the paging time window (PTW). At the PTW, the mobile device attempts to decode the Physical Downlink Control Channel (PDCCH) 125 and, if the PDCCH is successfully detected with P-RNTI, the mobile device decodes the associated PDSCH to obtain the page message. If the page is not sent, the attempt to detect WUS is unsuccessful. In accordance with examples herein, however, the mobile device refrains from decoding the control channel (e.g., PDCCH) and from synchronization using the SSB 124 under some conditions and determines whether a page message is sent by attempting to decode a preamble message 126.

For the example, the mobile device 102 receives transmission information 127 from a base station prior to entering the sleep state. The transmission information 127 at least includes transmission format information 128 indicative of the format of the page message preamble sequence 126 which includes information such as the preamble sequence details including the length, root sequence, and other information which may include the frequency and/or time location(s) of the preamble sequences. The number of preamble sequences to be transmitted may also be indicated in the transmission format information 128. For the examples herein, transmission format information 128 also includes information regarding the transmission format of the page message such as the Modulation and Coding Scheme (MCS), data-block size and the PDSCH resource location used for the page message, for example. The transmission format information 128 may also include the communication resources that will be used to transmit the page message. In some situations, parameters included in the transmission format information 128 may apply to both the page message preamble sequence 126 and the page message. For example, where the page message preamble sequence 126 is part of the header of the page message, parameters related to the PDSCH resources that may apply to both the page message preamble sequence 126 and the page message. The transmission information 127 may also include transmission timing information 129 indicative of the time that the page message will be transmitted by the base station. The transmission information 127 can be conveyed to the mobile device 102 through dedicated signaling (e.g., RRC Connection Release message) or via system information before the mobile device 102 enters the sleep state. Using the format information, the mobile device 102 attempts to acquire the page message preamble sequence 126. The page message preamble sequence indicates the existence of a page message for the mobile device. In one example, the page message preamble sequence is at the beginning of the paging timing window (PTW) in the Physical Downlink Shared Channel (PDSCH) transmission from the base station. In another example, a set of preamble sequences are transmitted prior to the PTW for the mobile device 102. Where the mobile device receives and buffers transmissions, the page message preamble sequence can be transmitted after the page message. In some situations, the successful detection by the mobile device 102 of the page message preamble sequence 126 provides the indication that a page message is being sent and unsuccessful detection by the mobile device of the page message preamble sequence 126 provides the indication that a page message is not being sent. In other situations, the page message preamble sequence provides one of two indicators where the mobile device evaluates the page message preamble sequence to determine whether the page message preamble sequence indicates a page message is being sent or page message is not being sent.

Where the mobile device 102 has maintained a system timing 122 that is at least a course timing, therefore, the mobile device 102 attempts to receive the page message preamble sequence 126 without receiving the control channel information. In some situations, the page message preamble sequence 126 allows the mobile device to fine tune the system timing 122. Accordingly, the mobile device 120 at least avoids the energy consuming process of decoding the control channel such as the PDCCH and may avoid receiving the SSB, before determining whether a page message has been sent.

Figure 2:
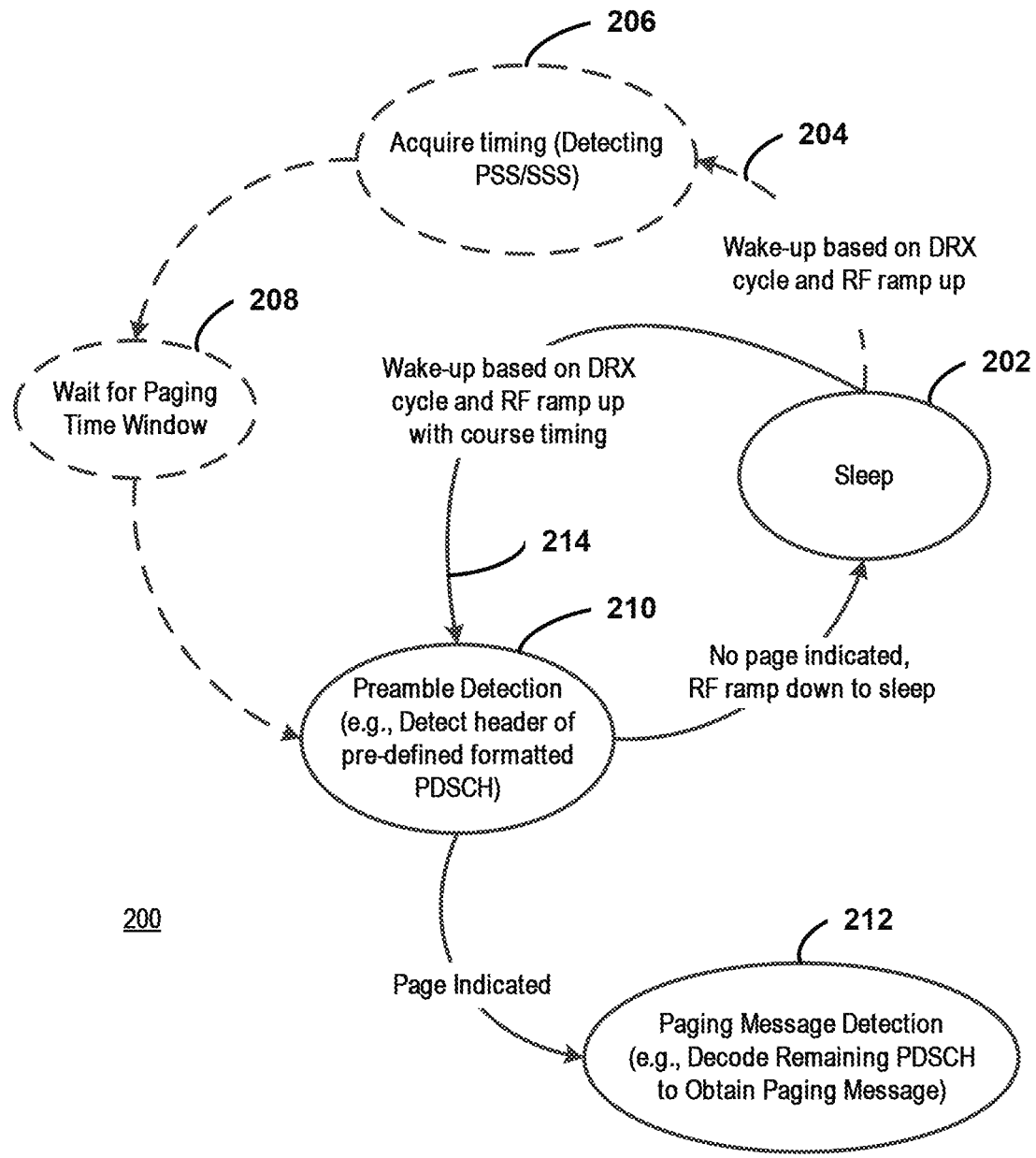
FIG. 2 is a state diagram for an example of a transition process where the mobile device exists a sleep state.

FIG. 2 is a state diagram for an example of a transition process 200 where the mobile device 102 exists a sleep state 202. For the example, the mobile device 102 had received transmission format information 127 from a base station prior to entering the sleep state 202. The wake-up transition 204, timing acquisition state 206 and the wait for PTW state 206 are performed in some circumstances where limited synchronization is performed and are optional in some examples. Such a condition may occur where the mobile device determines or estimates that adequate course timing is not available for direct page message preamble sequence 126 detection. From the sleep state 202, the mobile wakes up based on the DRX cycle and ramps up the RF circuits. If the mobile device 102 does not have adequate course timing, the mobile device transitions through the wake-up transition 204 to the timing synchronization state 206. For such an example, the mobile device 102 acquires the system timing by the detecting the synchronization signal block (SSB) including PSS/SSS. After the acquiring the system timing, the mobile device 102 transitions to the paging time window (PTW) waiting state 206 and waits for the PTW. At the PTW, the mobile device 102 enters the preamble detection state 210 where the mobile device 102 determines whether a page is being sent. For the example of FIG. 2, the mobile device 102 uses the transmission format information to detect a header of the predefined formatted PDSCH.

For the example of FIG. 2, the mobile device 102 transitions directly from the sleep state 202 to the preamble detection state 210 when adequate course timing is available. In many situations, the mobile device 102 directly transitions 214 to the preamble detection state 210 after the sleep state 202. For the examples herein, the mobile device uses the timing information 129 to determine the appropriate wake-up time that allows the mobile device to perform a wakeup sequence in adequate time to prepare the mobile device to receive page message preamble sequences associated with any page messages for the mobile device 102. Radio frequency (RF) circuits are ramped up and the receiver is prepared for detection of the page message preamble sequence. The timing information 129 may include DRX cycle information and paging timing information. The mobile device applies the transmission format information 128 to attempt to receive any page message preamble sequences that have been transmitted. Therefore, the mobile device 102 wakes-up based on the DRX cycle and the timing information 127, ramps up the RF circuits and attempts to receive the page message preamble sequence to determine if a page message is available for the mobile device. In some examples, the determination is made based on whether a page message preamble sequence is successfully detected. In other situations, the page message preamble sequence is received and evaluated to determine whether there is an indication of page or an indication of no page being sent. In one example, the page message preamble sequence is sent as at least one of a set of preamble sequences transmitted prior to the PTW for the mobile device 102. If the mobile device 102 determines that no page was sent, the mobile device 102 returns to the sleep state 202. If it is determined that a page is being sent, the mobile device 102 proceeds to the page message detection state 212 where mobile device receives the page message. For the examples herein, the mobile device 102 decodes the remainder of the PDSCH to receive the page message.

Figure 3:
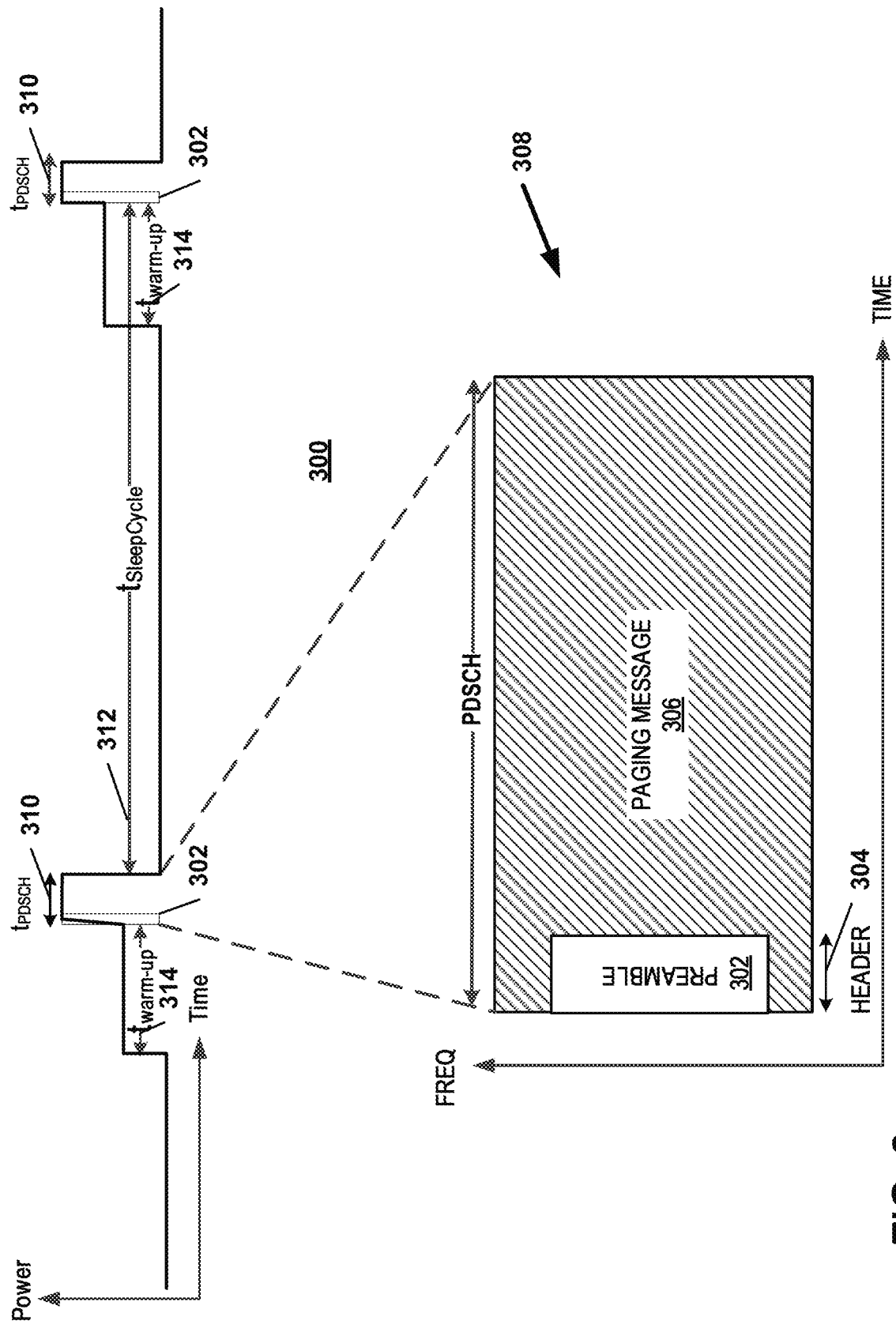
FIG. 3 is an illustration of power consumption over time relationship for a sleep-wake cycle of a mobile device for an example where a page message preamble sequence is transmitted as part of the header of the page message.

FIG. 3 is an illustration of power consumption over time relationship 300 for a sleep-wake cycle of a mobile device 102 for an example where a page message preamble sequence 302 is transmitted as art of the header 304 of the page message 306. The illustration is not necessarily to scale. For the example of FIG. 3, the physical data channel is referred to as the Physical Downlink Shared Channel (PDSCH) in accordance with 3GPP and the control channel is referred to as the Physical Downlink Control Channel (PDCCH). However, these channels may be referred to by other terms based on the particular communication standard and technology. In addition, in some situations, other physical downlink channels may be used for transmitting the page message. For example, a paging physical downlink channel may be designated for page message transmissions in some systems. Therefore, the PDSCH is only discussed as one example of a physical downlink channel where the page message is transmitted. The PDSCH 308 is transmitted within the PDSCH time ($t_{PDSCH}$) 310. The page message preamble sequence 302 is an example of the preamble message 126 discussed with reference to FIG. 1. The mobile device 102 enters a sleep state and periodically checks to determine whether a page message has been sent by the base station 104. The sleep cycle time ($t_{SleepCycle}$) 312 is the time between period of active state. However, time is needed to ramp up circuitry to be able to receive signals after the sleep state. When exiting the sleep state to check for a page message, therefore, the mobile device 102 powers and warms up circuitry needed to receive signals transmitted from the base station. For the example of FIG. 3, the circuit ramp up and warm-up period ($t_{warm-up}$) 314 is minimized to conserve power but is sufficiently long to ensure the circuits are operational at the time of the PTW. The page message preamble sequence 302 is part of a header 304 of the page message 306 for the example. Accordingly, the conventional PDSCH structure is modified by adding one or two symbols long preamble with a known sequence. The remaining symbols carry the page message with a known physical format. Therefore, an example of suitable structure of the preamble sequence 302 includes using the first symbol of the PDSCH for the header 304 where the header 304 has the same bandwidth as the page message bandwidth and the same frequency location. In some situations, the sequence design is similar to the SSB or Reference Signals designs such as, for example, device-specific Demodulation Reference Signals (DMRS). As discussed above, the format information 128 is transmitted to the mobile device 102 prior to the mobile device 102 entering the sleep state and includes information such as MCS and MIMO modes, for example. Therefore, the mobile device 102 is able to decode the PDSCH without decoding the PDCCH. In one alternative, the preamble sequence 203 is a function of both the mobile device identifier (UE ID) and the PDSCH format(s).

As discussed above, a default preamble sequence is transmitted in some situations to indicate that no page is present. In other implementations, no sequence is sent if there is no page for the mobile device. In such situations, the mobile device may determine there is no page message after receiving some predetermined set of symbols without detection of a sequence. The number of symbols may depend on the location of the preamble sequence. For example, if the page message preamble sequence 126 may only be present as part of the header of the paging message, the mobile device determines there is no page message available after receiving the symbols of the header without detecting any preamble sequence. In situations where the page message preamble sequence may be anywhere within the PTW, the mobile device receives transmissions within the entire PTW before determining no preamble sequence was sent. In response to not detecting the preamble sequence or detecting the default sequence, the mobile device returns to the sleep state immediately. Typically, the transmission of the default sequence reduces the chances for a false-alarm. However, in the case of a false-alarm, the worst result is that the mobile device spends extra energy to decode the page. A missed-detection of the existence of a page has worse consequences since it may be hours before the next paging opportunity if the mobile device misses a page because of a missed-detection. For the examples herein, therefore, each PO has a header such that the mobile device has a good chance to at least decode one of them. This is in contrast to the WUS approach whereby the WUS is only sent once before the first paging occasion.

Figure 4:
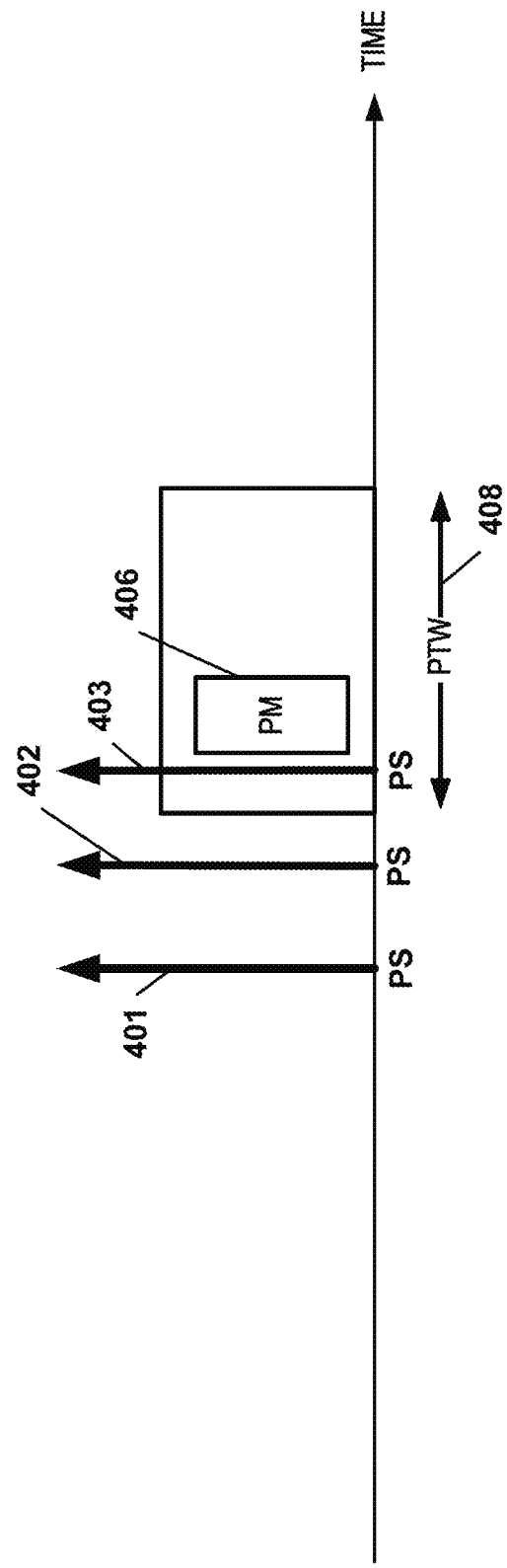
FIG. 4 is an illustration of base station transmissions for an example where the base station transmits a set of preamble sequence transmissions before the page message.

FIG. 4 is an illustration of base station 104 transmissions 400 for an example where the base station 104 transmits a set of preamble sequence transmissions 401, 402, 403 before the page message 406. The preamble sequence transmission is an example of the page message preamble sequence 126 discussed above. For the example, the set of preamble sequence transmissions 401, 402, 403 are separated in time with at least some of the transmission occurring before the paging timing window (PTW) 408 for the mobile device. Although the example includes three preamble sequences, any number may be used. As discussed above, the number of preamble sequences may be conveyed to the mobile device by the transmission information 127. The scheme takes advantage of the mobile devices waking up before the start of the PTW. The base station transmits the set of preamble-only transmissions within a short period before the start of the mobile device PTW. The transmission of the multiple preamble-only signals allows the mobile device to acquire synchronization much faster and delays the waking-up point as close to the PTW as possible. Minimizing the awake time before the PTW conserves power at the mobile device. In some situation, the preamble-only transmissions can be within the PTW and/or within the data channel including the page message 406

Figure 5:
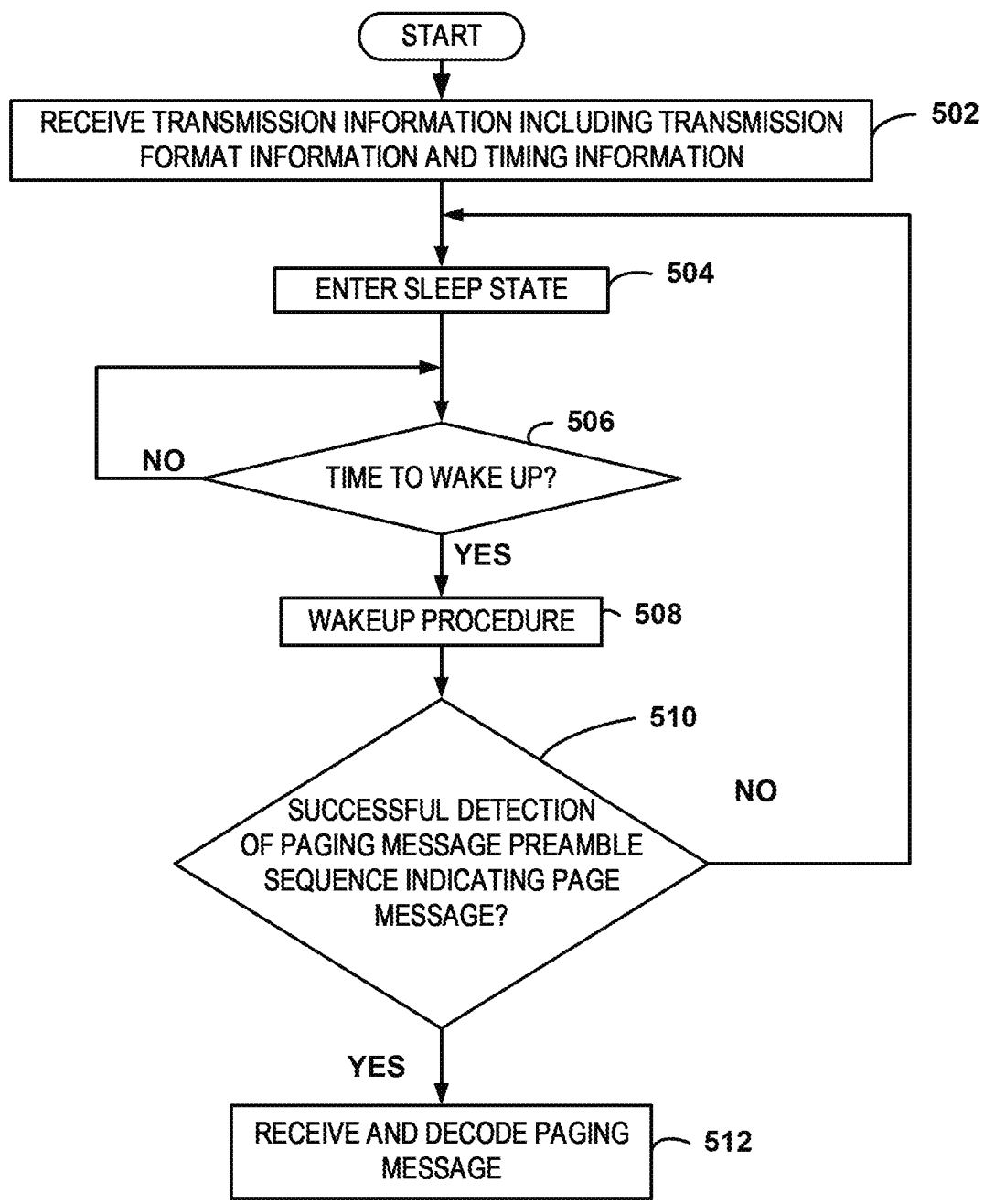
FIG. 5 is a flow chart of an example of a method of monitoring for a page message performed at a mobile device.

FIG. 5 is a flow chart of an example of a method of monitoring for a page message performed at a mobile device. Therefore, the method may be performed by devices such as the mobile device 102 discussed above.

At step 502, the mobile device receives the page message transmission information 127. For the example, the page message transmission information 127 includes transmission format information 128 and page message timing information 129. The transmission format information 128 is indicative of a transmission format of a page message for the mobile device and may include parameters such as MCS and MIMO modes. The page message timing information 129 is indicative of a transmission time of the page message.

At step 504, the mobile device enters the sleep state. Accordingly, the mobile device receives the page message transmission information 127 before entering the sleep state.

At step 506, the mobile device determines whether the mobile device should exit the sleep state to monitor for page message. For the example, the mobile device determines the appropriate time to wake up based on at least the DRX cycle and the page message timing information 129. The time to exit the sleep state is sufficiently early enough to prepare the receiver for receiving signals before the page message. If it is determined that the mobile device should exit the sleep state, the method continues at step 508. Otherwise, the method returns to step 504 where the mobile device returns to the sleep state.

At step 508, the mobile device executes a wakeup procedure. The wakeup procedure includes steps to warmup circuits and prepare the receiver and mobile device to receive signals in accordance with convention techniques.

At step 510, the mobile device attempts to receive the page message preamble sequence 126 and determines whether a page message preamble sequence 126 has been received indicating a page message is being transmitted to the mobile device. The mobile device uses the system timing 122 maintained at the mobile device to acquire subframe boundaries of the base stations transmissions and attempt reception of the page message preamble sequence 126. As discussed above, in some examples, the presence and successful detection of the page message preamble sequence 126 indicates the presence of the page. In other examples, the page message preamble sequence 126 is decoded to determines whether page exists for the mobile device. If the page message preamble sequence 126 indicates a page, the method continues to step 512 where the page is received and decoded. Otherwise, the method returns to the sleep state at 504.

As discussed above, the mobile device attempts to detect the page message preamble sequence 126 without decoding a downlink control channel to obtain signal transmission information related to transmission of the page message. For at least some of the examples, the mobile device also refrains from receiving the SSB or other synchronization signals prior to attempting detection. The mobile device uses the transmission format information in the attempt to acquire the page message preamble sequence that is transmitted within a downlink data channel transmission from the base station.

Therefore, with the techniques discussed herein, the mobile device reduces the need to perform energy consuming resynchronization procedures and decoding of control channels for page message notification procedures. In addition, unnecessary resynchronization and control channel decoding is completely avoided when no page message has been sent Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   prior to entering a sleep state at a mobile device, receiving page message transmission information comprising:
      transmission format information indicative of a transmission format of a page message for the mobile device; and
      page message timing information indicative of a transmission time of the page message;
   entering the sleep state;
   after a sleep duration at least partially based on the page message timing information, executing a wakeup sequence to prepare the mobile device to receive signals;
   without decoding a downlink control channel to obtain signal transmission information related to transmission of the page message from a base station, attempting to acquire, using the transmission format information and the page message timing information, a page message preamble sequence within a downlink data channel transmission from the base station, the page message preamble sequence indicating existence of the page message for the mobile device; and
   returning to the sleep state if no page message preamble sequence indicating the existence of the page message is received.

2. The method of claim 1, wherein the page message transmission information further comprises communication resource information identifying communication resources used for transmitting the page message.

3. The method of claim 1, further comprising:
   receiving the page message in response to receiving the page message preamble sequence indicating the existence of the page message.

4. The method of claim 3, wherein receiving the page message comprises decoding data channel symbols to obtain the page message.

5. The method of claim 4, wherein the data channel symbols are within a paging timing window (PTW) designated for the page message, the data channel symbols identified by the page message transmission information.

6. The method of claim 4, wherein the page message preamble sequence is a function of at least one of a transmission format indicated by the transmission format information and mobile device identifier.

7. The method of claim 1, wherein a determination that the page message preamble sequence was not received comprises receiving a default page message preamble sequence.

8. The method of claim 1, wherein the attempting to acquire the page message preamble sequence comprises attempting to acquire the page message preamble sequence without decoding any information in the control channel.

9. The method of claim 1, wherein the page message preamble sequence is transmitted within at least one of a plurality of preamble-only transmission signals transmitted before a paging timing window (PTW) designated for the page message.

10. The method of claim 1, wherein the page message preamble sequence is a transmitted as part of a header of the page message.

11. The method of claim 10, wherein the page message preamble sequence comprises a first symbol of the data channel having a frequency bandwidth the same as a page message frequency bandwidth of the page message and having a frequency location the same as a page message frequency location of the page message.

12. The method of claim 10, wherein the header comprises a mobile identifier of the mobile device.

13. A mobile device comprising:
   a receiver configured to receive page message transmission information prior to the mobile device entering a sleep state, page message transmission information comprising:
      transmission format information indicative of a transmission format of a page message for the mobile device; and
      page message timing information indicative of a transmission time of the page message; and
   a controller configured to place the mobile device in the sleep state for a sleep duration at least partially based on the page message timing information and execute a wakeup sequence to prepare the receiver to receive signals,
   the receiver further configured to, without a decoding of a downlink control channel to obtain signal transmission information related to transmission of the page message from a base station, attempting to acquire, using the transmission format information and the page message timing information, a page message preamble sequence within a downlink data channel transmission from the base station, the page message preamble sequence indicating existence of the page message for the mobile device,
   the controller configured to return the mobile device to the sleep state if no page message preamble sequence indicating the existence of the page message is received.

14. The mobile device of claim 13, wherein the page message transmission information further comprises communication resource information identifying communication resources used for transmitting the page message.

15. The mobile device of claim 13, the receiver further configured to receive the page message in response to receiving the page message preamble sequence indicating the existence of the page message.

16. The mobile device of claim 15, the receiver further configured to receive the page message by decoding data channel symbols to obtain the page message.

17. The mobile device of claim 16, wherein the data channel symbols are within a paging timing window (PTW)

designated for the page message, the data channel symbols identified by the page message transmission information.

18. The mobile device of claim 17, wherein the page message preamble sequence is a function of at least one of a transmission format indicated by the transmission format information and mobile device identifier.

19. The mobile device of claim 13, wherein the controller is configured to determine the page message preamble sequence was not received based on receipt of a default page message preamble sequence.

20. The mobile device of claim 13, wherein the receive is configured to attempt acquiring the page message preamble sequence by attempting to acquire the page message preamble sequence without decoding any information in the control channel.

21. The mobile device of claim 13, wherein the page message preamble sequence is transmitted within at least one of a plurality of preamble-only transmission signals transmitted before a paging timing window (PTW) designated for the page message.

22. The mobile device of claim 13, wherein the page message preamble sequence is a transmitted as part of a header of the page message.

23. The mobile device of claim 22, wherein the page message preamble sequence comprises a first symbol of the data channel having a frequency bandwidth the same as a page message frequency bandwidth of the page message and having a frequency location the same as a page message frequency location of the page message.

24. The mobile device of claim 22, wherein the header comprises a mobile identifier of the mobile device.

25. A method comprising:
    transmitting from a base station to a mobile device, page message transmission information comprising:
        transmission format information indicative of a transmission format of a page message preamble sequence for the mobile device; and
        page message timing information indicative of a transmission time of the page message; and
    after the mobile device enters a sleep station for a sleep duration at least partially based on the page message timing information, transmitting using the transmission format information and the page message timing information, a page message preamble sequence within a downlink data channel transmission, the page message preamble sequence indicating existence of the page message for the mobile device.

* * * * *